(12) United States Patent
Palma et al.

(10) Patent No.: US 8,098,920 B2
(45) Date of Patent: Jan. 17, 2012

(54) METHOD OF EXTRAPOLATING A GREY-LEVEL BIDIMENSIONAL IMAGE IN A RADIOGRAPHY DEVICE AND A RADIOGRAPHY DEVICE IMPLEMENTING SUCH A METHOD

(75) Inventors: Giovanni Palma, Bicetre (FR); Razvan Iordache, Paris (FR)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 12/477,969

(22) Filed: Jun. 4, 2009

(65) Prior Publication Data

US 2009/0304256 A1    Dec. 10, 2009

(30) Foreign Application Priority Data

Jun. 6, 2008    (FR) ...................... 08 53772

(51) Int. Cl.
*G06K 9/00*        (2006.01)
(52) U.S. Cl. ............... 382/132; 382/154; 378/4; 378/18
(58) Field of Classification Search .......... 382/128–144, 382/154; 378/4, 18, 901
See application file for complete search history.

(56) References Cited

U.S. PATENT DOCUMENTS

| | | | |
|---|---|---|---|
| 6,307,909 B1 | 10/2001 | Flohr et al. | |
| 7,231,077 B2 * | 6/2007 | Eck et al. | 382/132 |
| 7,773,086 B2 * | 8/2010 | Li et al. | 345/420 |
| 2007/0230652 A1 | 10/2007 | Scholz | |
| 2008/0123806 A1 | 5/2008 | Scholz | |
| 2009/0164541 A1 * | 6/2009 | Palma et al. | 708/290 |

FOREIGN PATENT DOCUMENTS

EP    0971318 A2    1/2000

OTHER PUBLICATIONS

Persson M; Schuamann T; Dale S; Bone D; Lindstrom C: "Suppression of artifacts due to data truncation when using segmented slant hole collimators in ectomography." 1998 IEEE Nuclear Science Symposium Conference Record. 1998 IEEE Nuclear Science Symposium and Medical Imaging Conference, vol. 3 1998, pp. 1625-1631, XP002510036, abrege, section III. B.

Karl Weisent, et al: "Enhanced 3-D-Reconstruction Algorithm for C-Arm Systems Suitable for Interventional Procedures." IEEE Transactions on Medical Imaging, IEEE Service Center, Piscataway, NJ, US, vol. 19, No. 5, May 1, 2000, XP011035981. ISSN: 0278-0062, abrege, section II. G.

Godfrey D. J; Rader A; Dobbins J. T. III: "Practical Strategies for the Clinical Implementation of Matrix Inversion Tomosynthesis (MITS)." Proceedings of the SPIE, vol. 5030, 2003, pp. 379-390, XP002510037, abrege, section 2.2.

Jonathan S. Maltz et al: "CT Truncation artifact removal using water-equivalent thickness derived from truncated projection data." Engineering in Medicine and Biology Society, 2007. EMBS 2007. 29th Annual International Conference of the IEEE, IEEE, Piscataway, NJ, USA, Aug. 1, 2007, pp. 2907-2911, XP031150094, ISBN:978-1-4244-0787-3. abrege, section II.

\* cited by examiner

*Primary Examiner* — Hoa Pham
(74) *Attorney, Agent, or Firm* — Global Patent Operation; Jonathan E. Thomas

(57) ABSTRACT

A method of extrapolating a bidimensional grey-level image using a radiography device.

6 Claims, 2 Drawing Sheets

METHOD OF EXTRAPOLATING A GREY-LEVEL BIDIMENSIONAL IMAGE IN A RADIOGRAPHY DEVICE AND A RADIOGRAPHY DEVICE IMPLEMENTING SUCH A METHOD

CROSS-REFERENCE TO RELATED APPLICATIONS

This application claims priorly under 35 U.S.C. §119(a)-(d) or (f) to prior-filed, co-pending French patent application serial number 0853772, filed on Jun. 6, 2008, which is hereby incorporated by reference in its entirely.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention concerns a method of extrapolating a two-dimensional grey-level image intended to be used in a radiography device, in particular of the tomosynthesis type.

2. Description of Related Art

In such a device, when a grey-level image is processed, it is necessary to "invent" information outside the field of the image (a field corresponding to the active surface of the detector of the radiography device). In particular, this is necessary when the pixels close to the edges of the detector are processed. When this extrapolation is carried out in an arbitrary fashion, artefacts and inconsistencies are created in the image processed. In the context of the application of digital tomosynthesis, such as digital tomosynthesis of the breast, the projection images are processed either during a pre-processing step (for example in order to apply a thickness compensation algorithm) or during a first filtering step in the context of a reconstruction algorithm of the filtered back-projection type. The edge-effect artefacts created during the pre-processing step propagate and are amplified in the reconstructed volume.

This is because, when an image must be thus processed, the lack of information at the limits of the field of the image often produces a few artefacts. The values of the pixels processed inside these areas are based on unknown data. Many approaches currently exist for "inventing" the information in these areas. Such approaches are described for example in the documents U.S. Pat. No. 6,307,909, EP 0 971 318, US 2007/0230652 which attempt to resolve this problem encountered in the context of tomography. Nevertheless, these methods are not applicable in the context of tomosynthesis of the breast because of the difference between the acquisition systems. Other more basic approaches such as replication of the last known value or replication by mirror exist. However, the information thus created is false in the context of an image to be processed composed of an object and a background: often the shape of the object is modified in the vicinity of the limits of the image. A second drawback may arise when consistency with the real data in terms of signal variation is not guaranteed and may therefore lead to over-estimations of intensity at the pixel being processed.

In an article by R M Lewitt entitled "Processing of incomplete measurement data in computed tomography" published in Medical Physics, volume 6, No. 5, September/October 1979, p 412-417, there is described a method of extrapolating this type of image using a three-dimensional mask of the object in order to evaluate the thickness of the object that the x-rays are passing through. However, in some applications, in particular in digital tomosynthesis of the breast, the 3D mask calculated is over-estimated because of the limited angulation described by the x-ray source in a radiography device for digital tomosynthesis of the breast. This over-estimation leads to a poor evaluation of the thickness of the object and then results in obtaining extrapolated images having inconsistencies and artefacts.

BRIEF SUMMARY OF THE INVENTION

One aim of embodiments of the invention is to propose a method for extrapolating bidimensional grey-level images issuing from a tomosynthesis sequence outside the surface of the detector in order to allow consistent processing over the entire detector that minimises artefacts in the vicinity of the edge of the detector. A method of extrapolating a bidimensional grey-level image in a radiography device having an x-ray source, a processor, and a means of recording the bidimensional grey-level image disposed opposite the source x-ray source, wherein the recording means has a limit, the method comprising:

a) determining using the processor a field of the bidimensional grey-level image to be extrapolated, where at each point on the field, a grey level is known and pertinent;

b) determination using the processor a bidimensional mask associated with the field and extrapolated beyond the limit of the recording means; and c) extrapolation using the processor the bidimensional grey-level image beyond the limit of the recording means from the bidimensional mask extrapolated.

Thus the use of an extrapolated bidimensional mask associated with the field of the grey-level bidimensional image to be processed makes it possible to extrapolate grey levels where there should be the object. The "invented" information is sufficiently close to what should be the signal beyond the limits of the detector in order to prevent deformation of the shape of the object in the image being processed. In addition, the pixels in the field of the image that are used for the extrapolation inside the extended mask are by definition known and pertinent, and therefore perfectly illustrating the true thickness of the object through which the x-rays pass at these points. Because of this, artefacts and inconsistencies are greatly limited during the extrapolation of the image.

Other characteristics and advantages of the invention will emerge during the following description of an embodiment of the invention. In the accompanying drawings.

Figure 1:
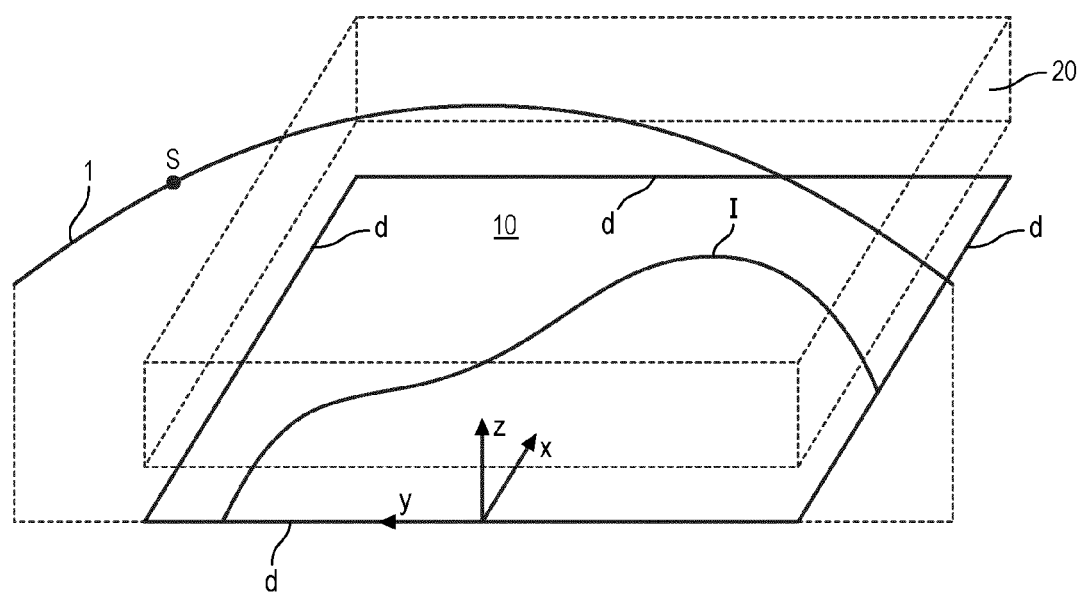
FIG. 1 is a three-dimensional schematic view of a device and the method according to the invention.

With reference to FIG. 1, a radiography device able to perform imaging by three-dimensional tomography comprises recording means 10 that are in the form of a detector of the substantially flat digital type. Such a digital detector comprises a matrix of sensors each forming a pixel and uniformly distributed in rows and columns. The radiography device also comprises a source S of x-rays opposite the recording means. The source S of x-rays is movable with respect to these same recording means. The source of x-rays, which is generally in the form of an x-ray tube, is able to move discretely along a path 1. Here illustrated in FIG. 1, the path 1 is substantially in an arc of a circle and is delimited angularly in an operating range $[\theta_{min}; \theta_{max}]$, where $0 \leq \theta_{min} \leq \theta_{max} \leq \pi$, and where the angles are measured with respect to the plane of the detector. With each discrete position of the source S on this path 1, there are associated an angle $\theta$, an image I projected and acquired by the detector 10, a field D of the image I and a bidimensional mask $M_D$.

In addition, a volume of interest 20 is situated between the source of x-rays and the recording means 10 and is able to contain an object intended to be radiographed by the radiography device. In the context of a radiography device for digital tomosythesis of the breast, the region of interest 20 has the shape of a right-angled parallelepiped, as illustrated in FIG. 1. The region of interest 20 is delimited by a breast support placed on the recording means 10, a top face of which is merged with the bottom face of the volume of interest 20, a compression pad, a bottom face of which is merged with a top face of the region of interest 20, and planes substantially parallel to the trunk of the patient and passing through the first and second rows of pixels of the detector as well as through the first and last columns of pixels of the detector, all for forming a limit D of the recording means 10.

In order to extrapolate the projected image I acquired by the detection means 10, it is useful to determine the field D associated with this projected image I. The field D of the projected image I comprises all the points (or pixels) P of the image I for which the associated grey level is known and pertinent. This means that the information on the value of the grey level is not contaminated by the presence of objects other than the object contained in the volume of interest 20 and which is intended to be radiographed. Such contaminating objects may be the collimator, the compression pad or any metallic parts of the system that may be projected onto the recording means 10 and that consequently make the projected image I partially unusable. For this purpose, by constructing the field D of the projected image I, the method according to the invention detects objects foreign to the object intended to be radiographed of the region of interest 20 and removes the pixels of the projected image I corresponding to the detection of these objects in order to obtain the field D of the projected image I. Various known solutions can be used for determining the field D. For example, it is possible to redefine the region of interest where it is certain that neither the pad not the collimator is projected. This is possible since the three-dimensional location of the compression pad and the geometry of the acquisition system are known and are particular to the radiography used. Another variant for determining the field D of the projected image I is to detect objects that greatly attenuate x-rays by means of predetermined thresholds and using a priori information (the collimator is always situated on the edge of the image, for example).

Once the field D associated with the projected image I in question has been determined, the method, in a following step, determines the mask $M_D$ associated with this field D. The mask $M_D$ is a bidimensional mask in which $M_D[P]$ is equal to 1 if the point P belongs to the area where the object intended to be radiographed contained in the region of interest 20 is projected and if the grey level at the point P is considered to be known and pertinent, otherwise $M_D[P]$ is equal to zero, and this for any pixel or point P on the detector forming the recording means 10. Next, this bidimensional mask $M_D$ is extrapolated beyond the limit d of the recording means 10. A preferred method for carrying out this extrapolation of the bidimensional mask $M_D$ is described in detail in the French patent application FR 07 60151 belonging to the applicant and to which it is possible to refer for fuller details on said method of extrapolating the bidimensional $M_D$. In a variant, the bidimensional mask $M_D$ can be extrapolated in the same way at the points or pixels of the field D corresponding to the projected image I for which the grey-level values are not known and/or pertinent, and have therefore not been considered for the production of the field D associated with the projected image I.

The method of extrapolating a bidimensional mask $M_D$, as described in French patent application No. FR 07 60151, comprises steps of:

at least partial estimation of a series of bidimensional masks $M_\gamma$ associated with a series of positions $S_\gamma$ of the source S situated between positions $S_{D'}$ and $S_D$ that the source may take, from the bidimensional masks $M_{D'}$ and $M_D$ associated with these positions $S_{D'}$ and $S_D$, a) at least partial evaluation of an intermediate three-dimensional mask of the object from the series of bidimensional masks $M_\gamma$ and bidimensional masks $M_{D'}$ and $M_D$, and b) extrapolation of the bidimensional mask $M_D$ beyond the limit D of the recording means according to a relative position between $S_{D'}$ and $S_D$ from the intermediate three-dimensional mask.

In addition, the method of extrapolating the bidimensional $M_D$ also comprises at least one of the following characteristics:

prior to step a), if the bidimensional mask $M_{D'}$ associated with the position of the source $S_{D'}$ is not available, the bidimensional mask $M_{D'}$ is then extrapolated from bidimensional masks then available, the extrapolation of step c) comprises a projection of the intermediate three-dimensional mask from the position $S_D$ onto a plane passing through the recording means, the at least partial estimation of step a) is performed on the limit d of the recording means according to the relative position between $S_{D'}$ and $S_D$, the at least partial estimation of step a) comprises, for each of the bidimensional masks $M_\gamma$, a step of determining a point $T_\gamma$ situated on an edge of the object projected onto the limit d of the recording means, the source occupying the position $S_\gamma$, the points $T_\gamma$ are estimated by a linear interpolation between points $T_{D'}$ and $T_D$ situated on an edge of the object projected onto the limit d of the receiving means (10), the source (S) occupying the positions $S_{D'}$ and $S_D$ respectively, if the bidimensional mask $M_{D'}$ associated with the position $S_{D'}$ of the source is not available, the point $T_{D'}$ is then extrapolated from points T then available, the method comprises an additional step of:

d) application of a closure to the extrapolated bidimensional mask $M_D$, prior to step a), the method comprises a step of determining an extrapolation limit $l_{fin}$ substantially parallel to the limit d of the recording means and situated outside the limits of the recording means, step b) comprises, for each line 1 substantially parallel to the extrapolation limit $l_{fin}$ and situated between the limit d of the recording means and the extrapolation limit $l_{fin}$, substeps of:

b1) estimation of a plane $P_1^D$ passing through the position $S_D$ and the line 1, b2) estimation of the intermediate three-dimensional mask for each voxel (v) situated at the intersection of the plane $P_1^D$ and the volume of interest, and step c) comprises a step of projection onto each line 1 substantially parallel to the extrapolation limit $l_{fin}$ and situated between the limit d of the recording means and the extrapolation limit $l_{fin}$ of the intermediate three-dimensional mask.

Once the bidimensional mask $M_D$ is determined and extrapolated, the method determines, in a subsequent step, an extrapolation of the associated projected image I. For this purpose, for each pixel or point P situated outside the limit d of the recording means 10, if $M_D[P]$ is equal to zero (the point or pixel P in question therefore does not belong to the radiographed object contained in the region of interest 20), then I[P] is initialised to a predetermined constant value corresponding to the grey level of the background. In general, this predetermined constant value corresponding to the grey level of the background is equal to zero.

Otherwise, if $M_D[P]$ is equal to 1 (the point or pixel P then belongs to the radiographed object contained in the region of interest 20), the value I[P] is extrapolated from the values of the points or pixels of the projected image I adjacent to the point or pixel P in question of the projected image I.

Figure 2:
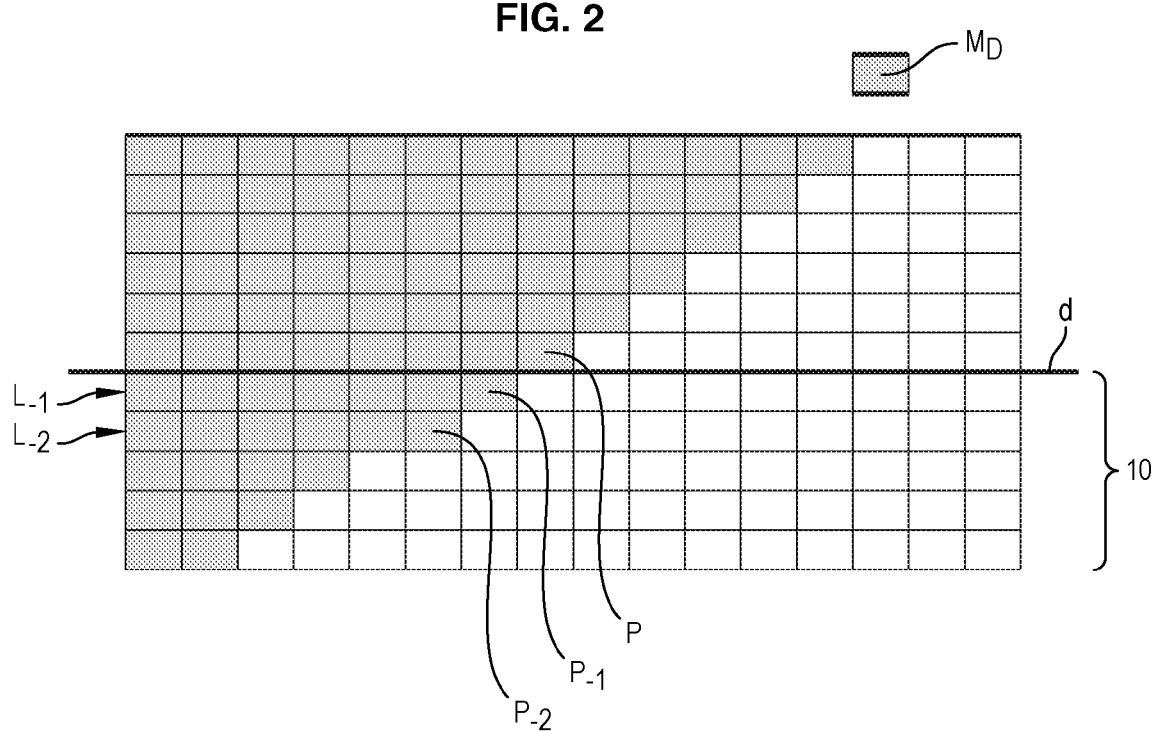
FIG. 2 is an enlarged schematic view illustrating the extrapolation of a point P of the image using adjacent points of the mask at the limits of the detector.
Figure 3:
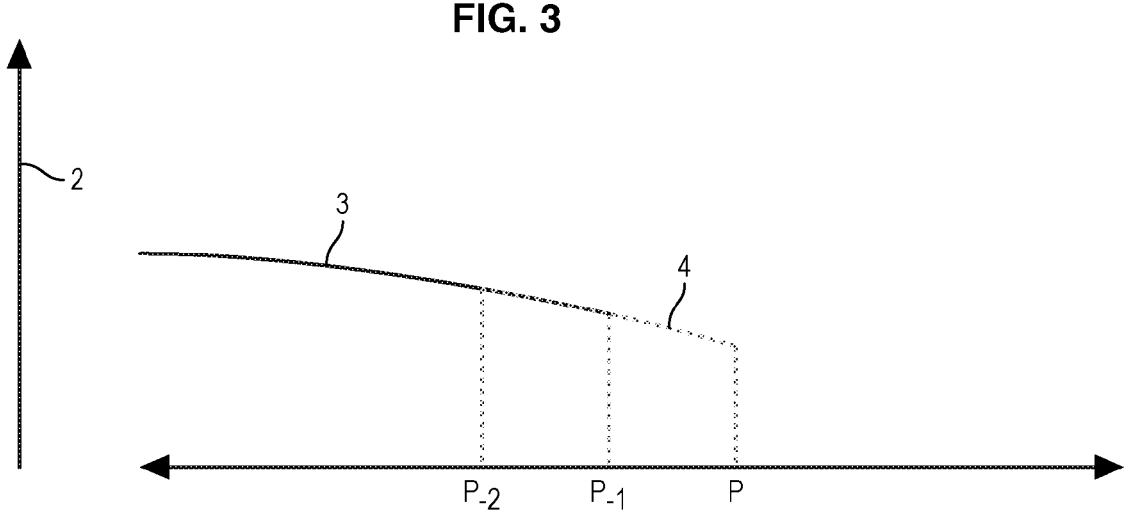
FIG. 3 is a diagram illustrating the extrapolation of the grey-level at the point P using the known grey level at the adjacent points.

With reference to FIGS. 2 and 3, a description will be given in more detail of such an extrapolation of the value I[P] at the point or pixel P of the projected image I. This extrapolation consists, in principle, of calculating the grey level of the point or pixel P of the projected image I by extrapolating it by means of the points or pixels of the projected image I adjacent to this point or pixel P. However, these adjacent points or pixels must fulfil one of the following conditions:

either the value in the bidimensional mask $M_D$, at these points, is equal to one and the value of the grey level is known and pertinent (and therefore given by the field D associated with the projected image I);

or the point(s) or pixel(s) is (are) already the result of a previous extrapolation and belongs or belong to the extrapolation mask.

In one embodiment, this extrapolation takes the form of a linear extrapolation as illustrated in particular in FIG. 3. The adjoining points or pixels are here two in number: $P_{-1}$ and $P_{-2}$. The point or pixel $P_{-1}$ is adjacent to the point or pixel P whereas the point or pixel $P_{-2}$ is adjacent to the point or pixel $P_{-1}$ but not to the point or pixel P. In this FIG. 3, the vertical axis 2 represents the grey levels whereas the curve 3 in a solid line represents the known and pertinent change in the grey levels of the field D of the points adjacent to the point P in question or previously extrapolated. The dotted line 4 illustrates the extrapolation of the grey level line 3 in order to determine the grey level at the point or pixel P in question, using a linear extrapolation. Nevertheless, through the shape of the object to be radiographed contained in the area of interest 20, the value of the grey level of a pixel or point P outside the limits can not always be interpolated using the points or pixels situated in the same column, as illustrated in FIG. 2. One solution in this situation is to extrapolate the grey level of the point or pixel P using the value of the grey level of the points $P_{-1}$ and $P_{-2}$ situated on the rows $L_{-1}$ and $L_{-2}$ that are the closest and that are included in the mask, that is to say $M[P_{-1}]$ and $M[P_{-2}]$ are equal to one. Once these points are selected, the method is in a similar situation as illustrated in FIG. 3.

Once all the points or pixels P situated outside the limit d of the detection means 10 have been calculated according to the above method, the method leads to the production of an extrapolated projected image I.

In a variant, the extrapolation of the projected image I can be effected in the same way at the points or pixels of the field D corresponding to the projected image I for which the grey-level values are not known and/or pertinent and had therefore not been considered for producing the field D associated with the projected image I. Thus it is possible to simply correct the grey-level values at these points or pixels.

The extrapolation method according to the invention therefore provides a robust approach for processing projection images issuing from a radiography device allowing acquisitions by tomosynthesis at the borders of the images. This makes it possible to prevent the appearance of the artefacts commonly encountered in this type of method and thus to improve the quality of the three-dimensional reconstruction that will be established from the projected images I thus extrapolated. In addition, an implementation of the method according to the invention in the context of a preprocessing of the projected images before applying an iterative reconstruction algorithm is crucial because the presence of artefacts and/or inconsistencies between the input images may dramatically degrade the quality of the final image obtained.

Advantageously but optionally, an embodiment of an extrapolation method may have at least one of the following characteristics:

step c) comprises a sub-step of, for each point outside the field, that is to say the value of the grey level at this point on the bidimensional image is not known or pertinent:

$c_1$) if the point is not in the extrapolated bidimensional mask, then an extrapolation value I[P] of the bidimensional image at the point is initialised to a predetermined constant value corresponding to a grey level of the background; step c) comprises a sub-step of, for each point outside the field, that is to say the value of the grey level at this point of the bidimensional image (I) is not known or pertinent:

$c_2$) if the point is in the extrapolated bidimensional mask, then an extrapolation value I[P] of the bidimensional image at the point is extrapolated from the known points in a vicinity of the point;

during step $c_2$), the known points in the vicinity of the point situated in the extrapolated bidimensional mask, that is to say the value at these points on the extrapolated bidimensional mask is equal to a value that is known and pertinent or already extrapolated corresponding to the existence of the radiographed object at these points; during step $c_2$), the extrapolation value I[P] is extrapolated according to a linear extrapolation;

during step $c_2$), the known points in the vicinity of the point are a point ($P_{-1}$) situated on a line adjacent to the point P and a point ($P_{-2}$) situated on a line adjacent only to the point ($P_{-1}$);

the bidimensional image belongs to a set of images acquired during a tomosynthesis of the object intended to be radiographed, in order to reconstruct a three-dimensional image outside the field of the images acquired during the tomosynthesis.

There is also provided, according to the invention, a radiography device that comprises an x-ray source, means of recording a bidimensional image disposed opposite the source and comprising a limit and a volume of interest comprising an object intended to be radiographed, situated between the source and the recording means in which the radiography device is arranged so as to implement an extrapolation method having at least one of the above characteristics.

Naturally it is possible to make many changes to the invention without for all that departing from the scope thereof. For example, the method of extrapolating a bidimensional image (I) according to the invention is applicable to a set of images acquired during tomosynthesis, in order to reconstruct a three-dimensional image of the object thus radiographed outside the field of the images acquired during tomosythensis.

What is claimed is:

1. A method of extrapolating a bidimensional grey-level image in a radiography device having an x-ray source, a processor, and a means for recording the bidmensional grey-level image disposed opposite the x-ray source, wherein the recording means has a limit, the method comprising:
   a) determining using the processor a field of the bidimensional grey-level image to be extrapolated, where at each point on the field, a grey-level value is known and pertinent,
   b) determining using the processor a bidimensional mask associated with the field and extrapolated beyond the limit of a recording means; and
   c) extrapolating, using the processor the bidimensional grey-level image beyond the limit of the recording means from the extrapolated bidimensional mask.

2. The method of claim 1, herein the extrapolating the bidimensional grey-level image further comprises:
   initializing, for each point outside the field that is not in the extrapolated bidimensional mask and that has a grey level value that is not known or pertinent, an extrapolation value of the bidimensional grey-level image to a predetermined constant value, which corresponds to a background grey-level.

3. The method of claim 1, wherein the extrapolating the bidimensional grey-level image further comprises:
   extrapolating, for each point outside the field that is in the extrapolated bidimensional mask and that has a grey level value that is not known or pertinent, an extrapolation value of the bidimensional grey-level image at the point (P) from known points in a vicinity of the point (P).

4. The method of claim 3, wherein a value of the points in the vicinity of the point has a grey level value that is known and pertinent or already extrapolated according to an existence of a radiographed object at one or more of said points.

5. The method of claim 3, wherein the extrapolation value is extrapolated linearly.

6. The method of claim 3, wherein the known points in the vicinity of the point are:
   a first point situated on a line adjacent to the point P and
   a second point situated on a line adjacent only to the point (P−1).

* * * * *

UNITED STATES PATENT AND TRADEMARK OFFICE
CERTIFICATE OF CORRECTION

| | | |
|---|---|---|
| PATENT NO. | : 8,098,920 B2 | Page 1 of 2 |
| APPLICATION NO. | : 12/477969 | |
| DATED | : January 17, 2012 | |
| INVENTOR(S) | : Palma et al. | |

It is certified that error appears in the above-identified patent and that said Letters Patent is hereby corrected as shown below:

In Column 1, Line 8, delete "APPIICATIONS" and insert -- APPLICATIONS --, therefor.

In Column 1, Line 10, delete "prionly" and insert -- priority --, therefor.

In Column 1, Line 13, delete "entirely." and insert -- entirety. --, therefor.

In Column 2, Line 33, delete "of" and insert -- for --, therefor.

In Column 2, Line 34, delete "the source" and insert -- the --, therefor.

In Column 2, Line 40, delete "is" and insert -- value is --, therefor.

In Column 2, Line 41, delete "determination" and insert -- determining --, therefor.

In Column 2, Line 43, delete "the recording" and insert -- a recording --, therefor.

In Column 2, Line 44, delete "extrapolation" and insert -- extrapolating --, therefor.

In Column 2, Line 46, delete "bidimensional mask extrapolated." and insert -- extrapolated bidimensional mask. --, therefor.

In Column 3, Line 26, delete "tomosythensis" and insert -- tomosynthesis --, therefor.

In Column 6, Line 29, delete "Advantageously" and insert -- Advantageously, --, therefor.

In Column 6, Line 62, delete "to the" and insert -- to an embodiment of the --, therefor.

In Column 7, Line 9, delete "tomosythensis." and insert -- tomosynthesis. --, therefor.

Signed and Sealed this
Eleventh Day of September, 2012

David J. Kappos
*Director of the United States Patent and Trademark Office*

In Column 7, Line 13, in Claim 1, delete "bidmensional" and insert -- bidimensional --, therefor.

In Column 7, Lines 18-19, in Claim 1, delete "pertinent," and insert -- pertinent; --, therefor.

In Column 7, Line 23, in Claim 1, delete "extrapolating," and insert -- extrapolating --, therefor.

In Column 7, Line 26, in Claim 2, delete "herein" and insert -- wherein --, therefor.